(12) United States Patent
Girase et al.

(10) Patent No.: US 12,094,214 B2
(45) Date of Patent: Sep. 17, 2024

(54) SYSTEM AND METHOD FOR PROVIDING AN AGENT ACTION ANTICIPATIVE TRANSFORMER

(71) Applicant: Honda Motor Co., Ltd., Tokyo (JP)

(72) Inventors: Harshayu Girase, Union City, CA (US); Nakul Agarwal, San Jose, CA (US); Chiho Choi, San Jose, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 326 days.

(21) Appl. No.: 17/733,858

(22) Filed: Apr. 29, 2022

(65) Prior Publication Data

US 2023/0351759 A1    Nov. 2, 2023

(51) Int. Cl.

| | |
|---|---|
| *G06V 20/56* | (2022.01) |
| *B60W 60/00* | (2020.01) |
| *G06N 3/08* | (2023.01) |
| *G06V 10/774* | (2022.01) |
| *G06V 10/82* | (2022.01) |
| *G06V 20/40* | (2022.01) |

(52) U.S. Cl.
CPC ......... *G06V 20/56* (2022.01); *B60W 60/0027* (2020.02); *G06N 3/08* (2013.01); *G06V 10/774* (2022.01); *G06V 10/82* (2022.01); *G06V 20/41* (2022.01); *G06V 20/46* (2022.01); *G06V 20/49* (2022.01); *B60W 2420/403* (2013.01)

(58) Field of Classification Search
CPC ........ G06V 20/56; G06V 20/49; G06V 20/46; G06V 10/82; G06V 20/41; G06V 10/774; B60W 60/0027; B60W 2420/403; G06N 3/08
See application file for complete search history.

(56) References Cited

U.S. PATENT DOCUMENTS

2020/0086858 A1* 3/2020 Yao ...................... G05D 1/0253

OTHER PUBLICATIONS

Abu Farha, Y., Richard, A., Gall, J.: When will you do what?—anticipating temporal occurrences of activities. In: Proceedings of the IEEE conference on computer vision and pattern recognition. (2018) 5343-5352.
Bunk, T., Varshneya, D., Vlasov, V., Nichol, A.: Diet: Lightweight language understanding for dialogue systems. arXiv preprint arXiv:2004.09936 (2020).

(Continued)

*Primary Examiner* — Michael D Lang
(74) *Attorney, Agent, or Firm* — RANKIN, HILL & CLARK LLP

(57) ABSTRACT

A system and method for providing an agent action anticipative transformer that include receiving image data associated with a video of a surrounding environment of an ego agent. The system and method additionally include analyzing the image data and extracting short range clips from the image data. The system and method also include analyzing the short range clips and extracting clip-level features associated with each of the short range clips. The system and method further include executing self-supervision using causal masking with respect to the extracted clip-level features to output action predictions and feature predictions to enable ego-centric action anticipation with respect to at least one target agent to autonomously control the ego agent.

20 Claims, 5 Drawing Sheets

(56) References Cited

OTHER PUBLICATIONS

Carion, N., Massa, F., Synnaeve, G., Usunier, N., Kirillov, A., Zagoruyko, S.: End-to-end object detection with transformers. In: European Conference on Computer Vision, Springer (2020) 213-229.
Carreira, J., Zisserman, A.: Quo vadis, action recognition? a new model and the kinetics dataset. In: proceedings of the IEEE Conference on Computer Vision and Pattern Recognition. (2017) 6299-6308.
Chen, H., Chirikjian, G.S.: Curvature: A signature for action recognition in video sequences. In: Proceedings of the IEEE/CVF Conference on Computer Vision and Pattern Recognition Workshops. (2020) 858-859.
Chen, H., Guo, P., Li, P., Lee, G.H., Chirikjian, G.: Multi-person 3d pose estimation in crowded scenes based on multi-view geometry. In: European Conference on Computer Vision, Springer (2020) 541-557.
Chibane, J., Pons-Moll, G.: Implicit feature networks for texture completion from partial 3d data. In: European Conference on Computer Vision, Springer (2020) 717-725.
Choi, C., Malla, S., Patil, A., Choi, J.H.: Drogon: A trajectory prediction model based on intention-conditioned behavior reasoning. In: Conference on Robot Learning, PMLR (2021) 49-63.
Dosovitskiy, A., Beyer, L., Kolesnikov, A., Weissenborn, D., Zhai, X., Unterthiner, T., Dehghani, M., Minderer, M., Heigold, G., Gelly, S., et al.: An image is worth 16x16 words: Transformers for image recognition at scale. arXiv preprint arXiv:2010.11929 (2020).
Elhoseiny, M., Saleh, B., Elgammal, A.: Write a classier: Zero-shot learning using purely textual descriptions. In: Proceedings of the IEEE International Conference on Computer Vision. (2013) 2584-2591.
Fan, H., Xiong, B., Mangalam, K., Li, Y., Yan, Z., Malik, J., Feichtenhofer, C.: Multiscale vision transformers. arXiv preprint arXiv:2104.11227 (2021).
Furnari, A., Farinella, G.M.: Rolling-unrolling lstms for action anticipation from rst-person video. IEEE transactions on pattern analysis and machine intelligence 43(11) (2020) 4021-4036.
Girdhar, R., Carreira, J., Doersch, C., Zisserman, A.: Video action transformer network. In: Proceedings of the IEEE/CVF Conference on Computer Vision and Pattern Recognition. (2019) 244-253.
Girdhar, R., Grauman, K.: Anticipative video transformer. In: Proceedings of the IEEE/CVF International Conference on Computer Vision. (2021) 13505-13515.
Güler, R.A., Neverova, N., Kokkinos, I.: Densepose: Dense human pose estimation in the wild. In: Proceedings of the IEEE conference on computer vision and pattern recognition. (2018) 7297-7306.
Gupta, A., Srinivasan, P., Shi, J., Davis, L.S.: Understanding videos, constructing plots learning a visually grounded storyline model from annotated videos. In: 2009 IEEE Conference on Computer Vision and Pattern Recognition, IEEE (2009) 2012-2019.
Kuehne, H., Arslan, A., Serre, T.: The language of actions: Recovering the syntax and semantics of goal-directed human activities. In: Proceedings of the IEEE conference on computer vision and pattern recognition. (2014) 780-787.
Li, J., Yang, F., Tomizuka, M., Choi, C.: Evolvegraph: Multi-agent trajectory prediction with dynamic relational reasoning. Proceedings of the Neural Information Processing Systems (NeurIPS) (2020).
Liu, H., Lu, J., Feng, J., Zhou, J.: Two-stream transformer networks for videobased face alignment. IEEE transactions on pattern analysis and machine intelligence 40(11) (2017) 2546-2554.
Mahmud, T., Hasan, M., Roy-Chowdhury, A.K.: Joint prediction of activity labels and starting times in untrimmed videos. In: Proceedings of the IEEE International Conference on Computer Vision. (2017) 5773-5782.
Martinez, J., Black, M.J., Romero, J.: On human motion prediction using recurrent neural networks. In: Proceedings of the IEEE Conference on Computer Vision and Pattern Recognition. (2017) 2891-2900.
Miech, A., Laptev, I., Sivic, J., Wang, H., Torresani, L., Tran, D.: Leveraging the present to anticipate the future in videos. In: Proceedings of the IEEE/CVF Conference on Computer Vision and Pattern Recognition Workshops. (2019) 0-0.
Qi, S., Huang, S., Wei, P., Zhu, S.C.: Predicting human activities using stochastic grammar. In: Proceedings of the IEEE International Conference on Computer Vision. (2017) 1164-1172.
Sener, F., Singhania, D., Yao, A.: Temporal aggregate representations for longrange video understanding. In: European Conference on Computer Vision, Springer (2020) 154-171.
Vaswani, A., Shazeer, N., Parmar, N., Uszkoreit, J., Jones, L., Gomez, A.N., Kaiser, L., Polosukhin, I.: Attention is all you need. arXiv preprint arXiv:1706.03762 (2017).
Vemulapalli, R., Arrate, F., Chellappa, R.: Human action recognition by representing 3d skeletons as points in a lie group. In: Proceedings of the IEEE conference on computer vision and pattern recognition. (2014) 588-595.
Walker, J., Marino, K., Gupta, A., Hebert, M.: The pose knows: Video forecasting by generating pose futures. In: Proceedings of the IEEE international conference on computer vision. (2017) 3332-3341.
Wang, L., Xiong, Y., Wang, Z., Qiao, Y., Lin, D., Tang, X., Van Gool, L.: Temporal segment networks: Towards good practices for deep action recognition. In: European conference on computer vision, Springer (2016) 20-36.
Wu, C.Y., Li, Y., Mangalam, K., Fan, H., Xiong, B., Malik, J., Feichtenhofer, C.: Memvit: Memory-augmented multiscale vision transformer for ecient long-term video recognition. arXiv preprint arXiv:2201.08383 (2022).
Yan, X., Rastogi, A., Villegas, R., Sunkavalli, K., Shechtman, E., Hadap, S., Yumer, E., Lee, H.: Mt-vae: Learning motion transformations to generate multimodal human dynamics. In: Proceedings of the European Conference on Computer Vision (ECCV). (2018) 265-281.
Zhang, J.Y., Felsen, P., Kanazawa, A., Malik, J.: Predicting 3d human dynamics from video. In: Proceedings of the IEEE/CVF International Conference on Computer Vision. (2019) 7114-7123.
Zhu, Y., Elhoseiny, M., Liu, B., Peng, X., Elgammal, A.: A generative adversarial approach for zero-shot learning from noisy texts. In: Proceedings of the IEEE conference on computer vision and pattern recognition. (2018) 1004-1013.

\* cited by examiner

SYSTEM AND METHOD FOR PROVIDING AN AGENT ACTION ANTICIPATIVE TRANSFORMER

BACKGROUND

Human action anticipation is a critical problem in computer vision that has gained attention over the last few years. Many important applications such as autonomous driving, video surveillance, and social robots depend on accurately anticipating the future actions of humans in a scene. The problem of action anticipation is that it is still relatively under-explored and far from being solved. In many instances, constraints associated with computational resources hinder the evaluation of a requisite amount of data to perform efficient action anticipation.

BRIEF DESCRIPTION

According to one aspect, a computer-implemented method is provided for providing an agent action anticipative transformer comprising. The computer-implemented method includes receiving image data associated with a video of a surrounding environment of an ego agent. The computer-implemented method also includes analyzing the image data and extracting short range clips from the image data. The computer-implemented method additionally includes analyzing the short range clips and extracting clip-level features associated with each of the short range clips. The computer-implemented method further includes executing self-supervision using causal masking with respect to the extracted clip-level features to output action predictions and feature predictions to enable ego-centric action anticipation with respect to at least one target agent to autonomously control the ego agent.

According to another aspect, a system is provided for providing an agent action anticipative transformer. The system includes a memory storing instructions that when executed by a processor cause the processor to execute the instructions. The instructions includes receiving image data associated with a video of a surrounding environment of an ego agent. The instructions also include analyzing the image data and extracting short range clips from the image data. The instructions additionally include analyzing the short range clips and extracting clip-level features associated with each of the short range clips. The instructions further include executing self-supervision using causal masking with respect to the extracted clip-level features to output action predictions and feature predictions to enable ego-centric action anticipation with respect to at least one target agent to autonomously control the ego agent.

According to yet another aspect, a non-transitory computer readable storage medium storing instructions that are executed by a computer, which includes a processor. The instructions perform a method that includes receiving image data associated with a video of a surrounding environment of an ego agent. The method also includes analyzing the image data and extracting short range clips from the image data. The method additionally includes analyzing the short range clips and extracting clip-level features associated with each of the short range clips. The method further includes executing self-supervision using causal masking with respect to the extracted clip-level features to output action predictions and feature predictions to enable ego-centric action anticipation with respect to at least one target agent to autonomously control the ego agent.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
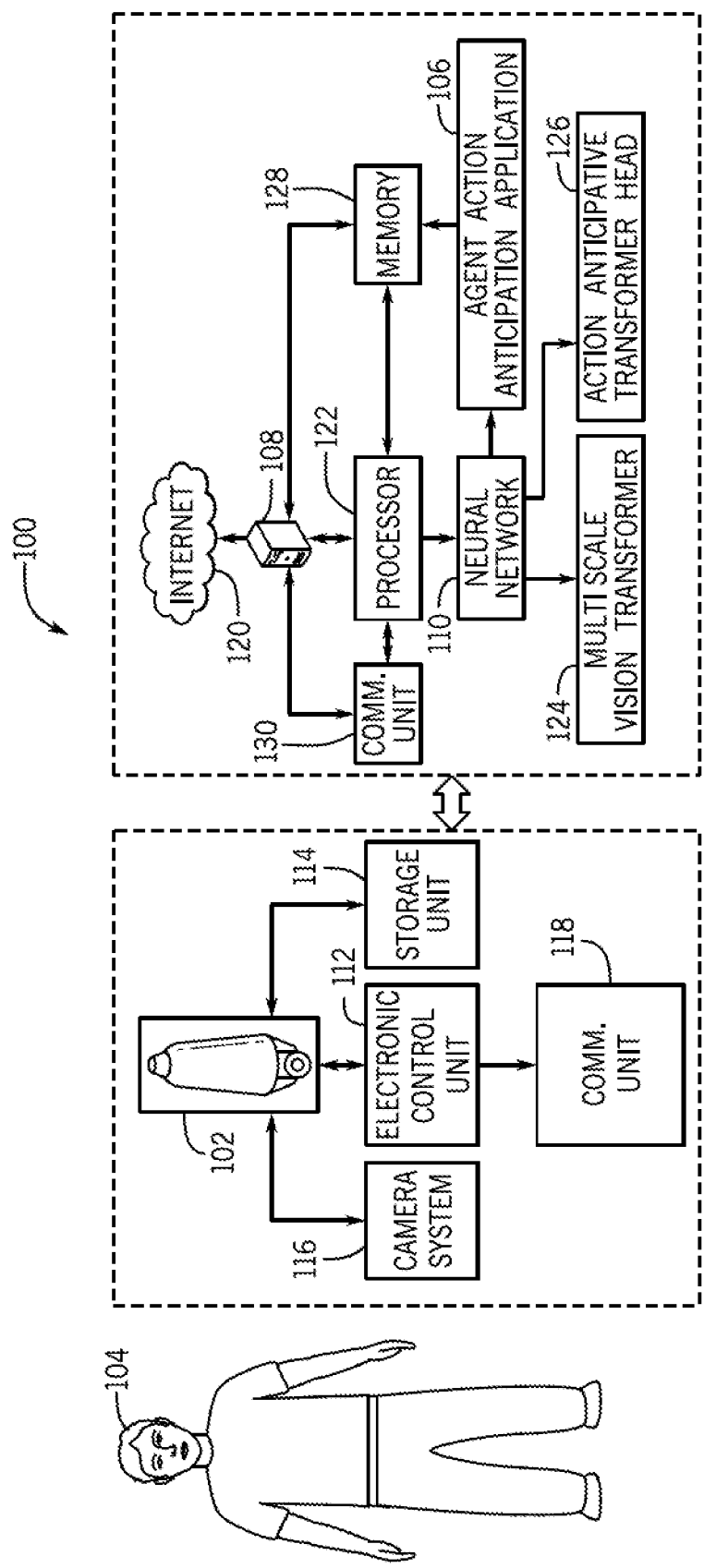
FIG. 1 is a high-level schematic view of an illustrative system for providing an agent active anticipative transformer according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview:

Referring now to the drawings, wherein the showings are for purposes of illustrating one or more exemplary embodiments and not for purposes of limiting same, FIG. 1 is a high-level schematic view of an illustrative system 100 for providing an agent active anticipative transformer according to an exemplary embodiment of the present disclosure. The components of the system 100, as well as the components of other systems and architectures discussed herein, may be combined, omitted or organized into different architectures for various embodiments.

In an exemplary embodiment, the illustrative system 100 may include an ego agent 102 that may interact with a target agent 104 and possibly a plurality of additional third-party agents. As shown in FIG. 1, the ego agent 102 may be configured as a mobile robot that may interact with the target agent 104 (e.g., an additional agent) that may be a human agent. In some embodiments, the ego agent 102 may be configured as a vehicle (e.g., car, truck, bus) and the target agent 104 may include an additional vehicle that may be operated by a human agent or may be autonomously operated within an environment. In additional embodiments, the target agent 104 may be a mobile robot or a human agent pedestrian that may be accounted for during the operation of the ego agent 102. Accordingly, it is to be appreciated that the ego agent 102 and/or the target agent 104 may be include or may be configured in various forms than what may be shown in FIG. 1.

In one embodiment, the system 100 may include an agent action anticipation application (action anticipation application) 106 that may be executed by an externally hosted server infrastructure (external server) 108 that may be configured to receive ego-centric videos of a surrounding environment of the ego agent 102. The action anticipation application 106 may be configured to perform ego-centric action anticipation of the target agent 104 at one or more future time steps (t, t+1, t+n) based on the ego-centric videos that are captured from the perspective of the ego agent 102 to predict ego-centric action anticipation of the target agent 104. The ego-centric action anticipation of the target agent 104 may be utilized by the action anticipation application 106 to autonomously control the ego agent 102 to perform one or more anticipatory actions that may be based on the prediction actions of the target agent 104 and/or projected spatio features for each of the actions associated with a next clip's features that may be associated with the environment of the ego agent 102. As discussed in more detail below, the action anticipation application 106 may be configured to utilize a two-stage fully transformer based architecture of a neural network 110 to perform the action prediction of the target agent 104 in addition to projecting spatio features for each of the actions associated with a next clip's features to determine ego-centric action anticipation with respect to anticipated actions of the target agent 104 at one or more future time steps.

The ego-centric action anticipation of the target agent 104 may pertain to various tasks of the target agent 104 which may or may not influence future actions of the ego agent 102. For example, actions of the target agent 104 that may include a human may include traveling actions such as walking/running within a vicinity of the ego agent 102 and/or crossing a path of travel of the ego agent 102. Actions of the target agent 104 may also include driving actions that may pertain to driving an additional vehicle within a vicinity of the ego agent 102. Actions of the target agent 104 may additionally include task-related actions that may pertain to actions that relate to a completion of tasks that are being performed by the target agent 104. Task-related actions may include, but may not be limited to, process steps, assembly steps, cooking steps, manufacturing steps, and the like that may be completed in collaboration with the ego agent 102 and/or within a vicinity of the ego agent 102. It is to be appreciated that many contemplated actions of the target agents 104 that may directly or indirectly influence the operation of the ego agent 102 may be anticipated with respect to the ego-centric action anticipation completed by the action anticipation application 106.

As discussed in more detail below, the action anticipation application 106 may utilize a two-stage full transformer based architecture of the neural network 110 which includes a video transformer spatial temporal backbone that operates on short range clips and a head transformer encoder that temporally aggregates information from these multiple clips to span a long-term horizon. The two-stage reasoning implemented by the action anticipation application 106 allows the analysis of longer time horizons and makes it suitable for future prediction as the application 106 determines a greater understanding of scene dynamics in comparison to existing methods. In addition to spanning longer time horizons, the functionality of the action anticipation application 106 enables achievement of enhanced performance with fewer parameters and efficient training time relative to existing methods.

The action anticipation application 106 thereby provides an improvement to a computer and the technology with respect to providing a more efficient processing runtime and allows the analysis of a long-term horizon of spatio-temporal based information without utilizing an encoder-decoder structure. The action anticipation application 106 utilizes a neural network 110 that is configured with a spatial temporal backbone and a head transformer encoder to predict actions of agents and spatial features. Additionally, the action anticipation application 106 provides an improvement to a computer and the technology with respect to autonomous control of an ego agent 102 by providing electronic autonomous controls that pertain to and/or account for the predicted actions of agents and future spatial features.

With continued reference to FIG. 1, in one embodiment, the ego agent 102 may include a plurality of components that may include, but may not be limited to, an electronic control unit (ECU) 112, a storage unit 114, a camera system 116, and a communication unit 118. In an exemplary embodiment, the ECU 112 may execute one or more applications, operating systems, ego agent system and subsystem executable instructions, among others. In one or more embodiments, the ECU 112 may include a microprocessor, one or more application-specific integrated circuit(s) (ASIC), or other similar devices. The ECU 112 may also include an internal processing memory, an interface circuit, and bus lines for transferring data, sending commands, and communicating with the plurality of components of the ego agent 102.

The ECU 112 may include a respective communication device (not shown) for sending data internally to components of the ego agent 102 and communicating with externally hosted computing systems (e.g., external to the ego agent 102). Generally, the ECU 112 may be operably connected to the storage unit 114 and may communicate with the storage unit 114 to execute one or more applications, operating systems, vehicle systems and subsystem user interfaces, and the like that are stored on the storage unit 114. In one embodiment, the storage unit 114 may be configured to store object classification data (not sure) that may be utilized to complete object based classification of dynamic objects and/or static objects that may be located within the surrounding environment of the ego agent 102. In another embodiment, the storage unit 114 may additionally be configured to store image data that is provided by the camera system 116 of the ego agent 102. The image data may pertain to ego-centric videos of the surrounding environment of the ego agent 102 that may be captured at one or more points in time.

In one or more embodiments, the ECU 112 may be configured to operably control the plurality of components of the ego agent 102. The ECU 112 may also provide one or more commands to one or more control units (not shown) of the ego agent 102 including, but not limited to, a motor/engine control unit, a braking control unit, a turning control unit, a transmission control unit, and the like to control the ego agent 102 to be autonomously operated. As discussed, the ECU 112 may autonomously control the ego agent 102 based on ego-centric action anticipation of the target agent 104 that may be completed by the action anticipation application 106.

In an exemplary embodiment, the camera system 116 of the ego agent 102 may include one or more cameras that are positioned at one or more exterior portions of the ego agent 102 to capture ego-centric videos of the surrounding environment of the ego agent 102 (e.g., a vicinity of the ego agent 102). The camera(s) of the camera system 116 may be positioned in a direction to capture the surrounding environment of the ego agent 102 that includes areas located around (front/sides/behind) the ego agent 102.

In one or more configurations, the one or more cameras of the camera system 116 may be disposed at external front, rear, and/or side portions of the including, but not limited to different portions of the bumpers, lighting units, body panels, and the like. The one or more cameras may be positioned on a respective planar sweep pedestal (not shown) that allows the one or more cameras to be oscillated to capture images of the surrounding environment of the ego agent 102.

In one embodiment, the camera system 116 may output image data that may be associated with ego centric videos of the surrounding environment of the ego agent 102. The action anticipation application 106 may be configured to execute image logic (e.g., pre-trained computer logic) to analyze the image data and determine ego agent ego-centric based observations associated with the surrounding environment of the ego agent 102. In one configuration, the image data may be further analyzed using the image logic to determine the position of the target agent 104, a classification of the target agent 104, coordinates associated the movement of the target agent 104, and may communicate such data in addition to image data to be inputted to the neural network 110 that may implement the spatial temporal backbone and head transformer encoder, as discussed below.

In one embodiment, the communication unit 118 of the ego agent 102 may be operably controlled by the ECU 112 of the ego agent 102. The communication unit 118 may be operably connected to one or more transceivers (not shown) of the ego agent 102. The communication unit 118 may be configured to communicate through an internet cloud 120 through one or more wireless communication signals that may include, but may not be limited to Bluetooth® signals, Wi-Fi signals, ZigBee signals, Wi-Max signals, and the like.

Figure 2:
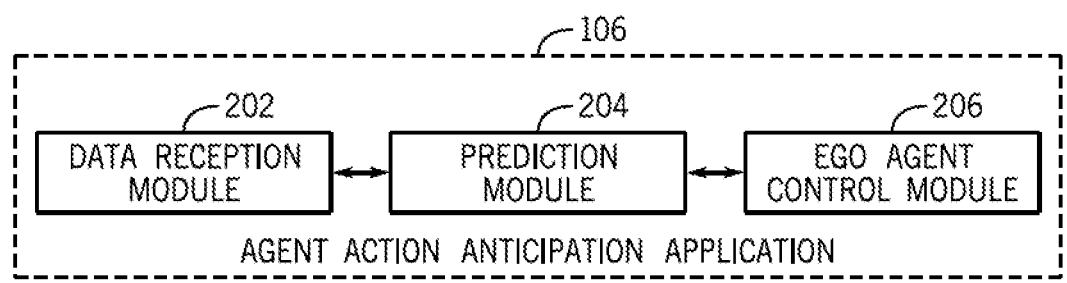
FIG. 2 is a schematic overview of a plurality of modules for providing an agent action anticipative transformer according to an exemplary embodiment of the present disclosure.

In one embodiment, the communication unit 118 may be configured to connect to the internet cloud 120 to send and receive communication signals to and from the external server 108. The external server 108 may host the neural network 110 that may be pre-trained with one or more data sets and may include the spatial temporal backbone and head transformer encoder structure (as shown in FIG. 2). One or more datasets that may be pre-trained to the neural network 110 may include a task related dataset (not shown) that may be associated with tasks that are being executed by the ego agent 102 and/or the target agent 104. In one embodiment, such tasks may include, but may not be limited to, navigational tasks (e.g., autonomous driving) and/or task-related actions that may pertain to atomic actions that relate to tasks that are being performed by the target agent 104 (e.g., cooking steps, assembly steps, process steps) that may be completed in collaboration with the ego agent 102 and/or within a vicinity of the ego agent 102.

In one embodiment, the task related data may be accessed and analyzed to determine one or more autonomous controls to autonomously control the operation of the ego agent 102 based on the ego-centric action anticipation of the target agent 104. For example, the task related data may be accessed and analyzed to determine one or more atomic actions that may be implemented by the ego agent 102 in response to the ego-centric action anticipation of the target agent 104 with respect to the completion of an assembly operation, a cooking operation, or a driving operation.

In an exemplary embodiment, the neural network 110 may be configured as a transformer model that is configured to learn context and meaning from the image data of the ego-centric videos by tracking relationships in sequential data with respect to features extracted from short video clips of the ego-centric video as captured by the camera system 116. The neural network 110 may include a multiscale vision transformer 124. In one embodiment, the multiscale vision transformer 124 is configured to provide a spatial temporal backbone of the neural network 110 to use machine learning/deep learning techniques to provide spatio-temporal reasoning through varying spatial and temporal resolutions of the multiscale vision transformer 124. The multiscale vision transformer 124 of the neural network 110 may operate similarly to a convolutional neural network which may be specially designed to operate with varying resolution/channel sizes at each layer to aid in learning high level features vs. low level features. The multiscale vision transformer 124 may adopt a similar approach through key and value pooling in the multiscale vision transformer 124. As discussed below, the multiscale vision transformer 124 may accordingly analyze the image data associated with the ego-centric videos of the surrounding environment of the ego agent 102 to extract rich spatio-temporal features at a clip-level.

In one embodiment, the neural network 110 may also include an action anticipative transformer head 126. The action anticipative transformer head 126 is configured to temporally aggregate short-clips based on the spatio-temporal aggregation of rich spatio-temporal features at the clip-level of a plurality of short clips to span a long-term horizon. As discussed below, the action anticipative transformer head 126 may execute machine learning/deep learning techniques to predict an action distribution and project the transformer's feature representation of the next clip's features back into an original feature space. Accordingly, the action anticipation application 106 may be configured to analyze the prediction of actions and projection of spatial features to determine an ego-centric action anticipation of the target agent 104 at one or more future time steps which may be utilized to autonomously control the operation of the ego agent 102.

With continued reference to the external server 108, the processor 122 may be operably connected to a memory 128. The memory 128 may store one or more operating systems, applications, associated operating system data, application data, executable data, and the like. In one embodiment, the processor 122 may be configured to process information associated with the ego agent 102 and the target agent 104 at one or more time steps and may store associated data on the memory 128 to be analyzed by the neural network 110.

In one embodiment, the processor 122 of the external server 108 may additionally be configured to communicate with a communication unit 130. The communication unit 130 may be configured to communicate through the internet cloud 120 through one or more wireless communication signals that may include, but may not be limited to Bluetooth® signals, Wi-Fi signals, ZigBee signals, Wi-Max signals, and the like. In one embodiment, the communication unit 130 may be configured to connect to the internet cloud 120 to send and receive communication signals to and from the ego agent 102. In particular, the external server 108 may receive image data that may be communicated by the ego agent 102 based on the utilization of the camera system 116. As discussed below, such data may be inputted to the multiscale vision transformer 124 of the neural network 110 in order to be further analyzed by the neural network 110.

II. The Agent Action Anticipation Application and Related Methods

The components of the action anticipation application 106 will now be described according to an exemplary embodiment and with reference to FIG. 1. In an exemplary embodiment, the action anticipation application 106 may be stored on the memory 128 and executed by the processor 122 of the external server 108. In another embodiment, the action anticipation application 106 may be stored on the storage unit 114 of the ego agent 102 and may be executed by the ECU 112 of the ego agent 102.

The general functionality of the action anticipation application 106 will now be discussed. FIG. 2 is a schematic overview of a plurality of modules 202-206 for providing an agent action anticipative transformer according to an exemplary embodiment of the present disclosure. In an exemplary embodiment, the action anticipation application 106 may include a data reception module 202, a prediction module 204, and an ego agent control module 206. However, it is to be appreciated that the action anticipation application 106 may include one or more additional modules and/or submodules that are included in addition to the modules 202-206.

Figure 3:
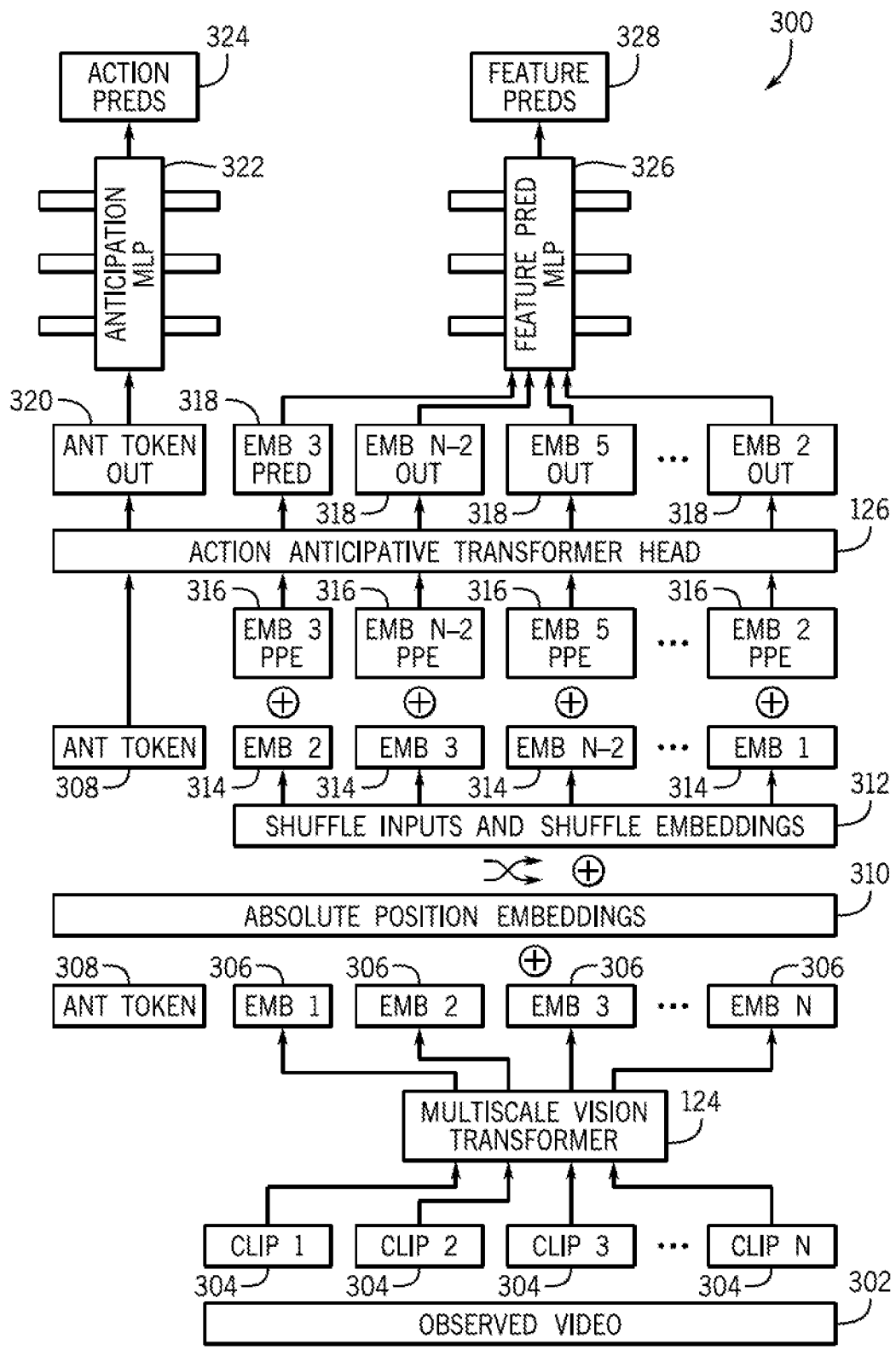
FIG. 3 is a schematic overview of an architecture of a spatial temporal backbone and a head transformer encoder structure of a neural network according to an exemplary embodiment of the present disclosure.
Figure 4:
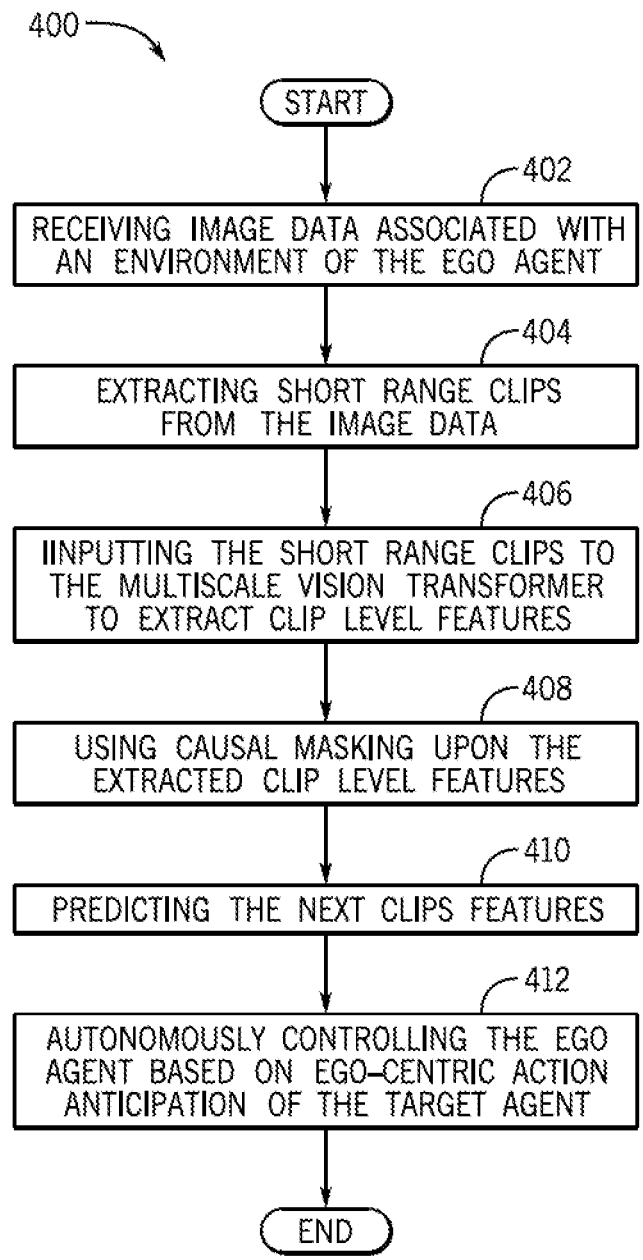
FIG. 4 is a process flow diagram of a method for utilizing a video transformer spatial temporal backbone according to an exemplary embodiment of the present disclosure.

FIG. 3 is a schematic overview of an architecture 300 of the spatial temporal backbone and head transformer encoder structure of the neural network 110 according to an exemplary embodiment of the present disclosure. The components of FIG. 3 will be now be described in more detail with respect to the methods 400 and 500 of FIG. 4 and FIG. 5 that are implemented by the action anticipation application 106. FIG. 4 is a process flow diagram of a method 400 for utilizing the video transformer spatial temporal backbone according to an exemplary embodiment of the present disclosure. FIG. 4 will be described with reference to the components of FIG. 1, FIG. 2, and FIG. 3, through it is to be appreciated that the method of FIG. 4 may be used with other systems/components.

In an exemplary embodiment, the method 400 may begin at block 402, wherein the method 400 may include receiving image data associated with an environment of the ego agent 102. With reference to FIGS. 1-4, in one embodiment, the data reception module 202 may communicate with the camera system 116 to receive image data from the camera system 116 that may be associated with an ego-centric video 302 of the surrounding environment of the ego agent 102. In one configuration, the data reception module 202 may be configured to execute image logic to analyze the image data and determine ego agent ego-centric based observations associated with the surrounding environment of the ego agent 102. The data reception module 202 may also be configured to analyze the image data to determine additional data associated with the position of the target agent 104, a classification of the target agent 104, coordinates associated the movement of the target agent 104, and the like. In one embodiment, the data reception module 202 may be configured to communicate the image data and the determined additional data to the prediction module 204 of the action anticipation application 106.

The method 400 may proceed to block 404, wherein the method 400 may include extracting short range clips from the image data. In one embodiment, the action anticipation application 106 may be configured to input the image data associated with the ego-centric video 302 of the surrounding environment of the ego agent 102 to the neural network 110 to be analyzing using machine learning/deep learning techniques. In some embodiments, additional data associated with the position of the target agent 104, a classification of the target agent 104, coordinates associated the movement of the target agent 104 may also be inputted to the neural network 110.

In an exemplary embodiment, upon receiving the image data associated with the ego-centric video 302 of the surrounding environment and spatial features of the ego agent 102, the neural network 110 may be configured to split the ego-centric video 302 $V_{s,t}=[F_1 \ldots F_t]$ into sub-clips 304 $v=[C_1, C_2 \ldots C_m]$. In particular, the ego-centric video 302 may be split into n number of short range sub-clips 304 that each include a particular number of frames of the ego-centric video 302.

The method 400 may proceed to block 406, wherein the method 400 may include inputting the short range clips to the multiscale vision transformer 124 to extract clip level features. In an exemplary embodiment, upon splitting the ego-centric video 302 $V_{s,t}=[F_1 \ldots F_t]$ into the number of sub-clips 304 $v=[C_1, C_2 \ldots C_m]$, the neural network 110 may communicate respective data to the prediction module 204. The prediction module 204 may thereby communicate with the neural network 110 to feed the sub-clips 304 $v=[C_1, C_2 \ldots C_m]$ of the ego-centric video 302 to the multiscale vision transformer 124. In one embodiment, each of the sub-clips 304, $c_i$ may be independently inputted to the multiscale vision transformer 124. The multiscale vision transformer 124 may be configured to analyze each of the sub-clips 304 and may extract clip-level features. The extracted clip level features may be output as clip embeddings 306 $[C_1 \ldots C_m]$. Additionally, output tokens corresponding to the clip-level features are used for clip level losses to train an extra anticipation token 308 to learn useful information from all input clip tokens. Such information may pertain to, but may not be limited to, the position of the target agent 104, a classification of the target agent 104, coordinates associated the movement of the target agent 104 that may be derived partially from data inputted to the neural network 110.

The method 400 may proceed to block 408, wherein the method 400 may include using causal masking upon the extracted clip level features. In an exemplary embodiment, upon outputting the clip embeddings 306 $[C_1 \ldots C_m]$ as being the clips extracted features for each sub-clip 304, $C_i$, the neural network 110 may use positional encodings represented as absolute position embeddings 310 for sequence modeling with respect to the clip embeddings 306 $[C_1 \ldots C_m]$ for each time-step. Accordingly, positional information is added to the model explicitly to retain the information regarding the order of clip embeddings 306 $[C_1 \ldots C_m]$ in a sequence. In one embodiment, absolute position embeddings 310 may be inputted and output as a matrix, where each row of the matrix represents an encoded object of the sequence summed with its positional information.

In one embodiment, the clip embeddings 306 may be shuffled and shuffle embeddings in the form of absolute position embeddings 310 may be added as shuffle inputs and shuffle embeddings 312. In particular, the shuffle inputs and shuffle embeddings 312 may be added to allow the action anticipative transformer head 126 to learn where each sub-clip 304 has been randomly shuffled to randomly mask the sub-clips 304 $v=[C_1, C_2 \ldots C_m]$. In particular, the neural network 110 may utilize a causal mask for self-supervision to a provide a more generalized supervised learning approach which allows the neural network 110 to complete random masking of self-supervision with respect to the ego-centric video 302. Stated differently, the sub-clips 304 may be randomly masked by using a causal mask to ensure that there is no information leakage.

In one embodiment, the neural network 110 may be configured to use causal masks for random clip masking without temporal leakage by shuffling the inputs before applying the causal mask. Accordingly, the causal mask may ensure that there is no information leakage through transformer layers and the shuffling allows for randomized masking across all possible clip combinations. As represented in FIG. 3, upon adding absolute position embeddings 310, the neural network 110 is configured to shuffle the inputs and add learned shuffle embeddings 314 to allow the transformer to learn where each clip has been randomly shuffled to.

In one or more embodiments, upon shuffling, the neural network 110 is configured to provide information about what the next shuffled clip is and adds the information about the next shuffled clip as shuffled embeddings that are provided with future position encoding 316. The future position encoding 316 is of the next timestep's clip features.

With continued reference to FIGS. 1-4, the method 400 may proceed to block 410, wherein the method 400 may include predicting the next clip's features. In an exemplary embodiment, upon providing information about the next shuffled clip as shuffled embeddings that are provided with future position encoding 316, the shuffled embeddings that are provided with future position encoding 316 are inputted to the action anticipative transformer head 126. The action anticipative transformer head 126 is configured to temporally aggregate data associated with the shuffled embeddings that are provided with future position encoding 316 that originally have been derived from the sub-clips 304 to span a long-term horizon.

In one configuration, the action anticipative transformer head 126 completes the self-supervision task to predict the next clips features in the sequences based on what has already been observed and outputs future feature embeddings 318 pertaining to a prediction of the next clip's features. The action anticipative transformer head 126 may also provide an output of the class token (output class token) 320 that includes useful information with respect to predicted clip features for all input clip tokens. Such useful information may pertain to, but may not be limited to, a prediction of a future position of the target agent 104, a future classification of the target agent 104, future coordinates associated the movement of the target agent 104, and the like. The output class token 320 is not restricted to be in the same latent space as the clip-features tokens output as clip embeddings 306 [$C_1 \ldots C_m$] and may be utilized to capture information needed to anticipate a next action of the target agent 104.

As shown in FIG. 3, the neural network 110 may include an anticipation MLP head 322 which may intake the output class token 320 provided by the action anticipative transformer head 126 and may predict an action distribution associated with the action predictions 324 of the target agent 104 given the output class token 320. For example, the anticipation MLP head 322 may be configured to output a distribution over thousands of action classes. The neural network 110 may additionally include a feature prediction MLP head 326 which is configured to receive the future feature embeddings 318 output by the action anticipative transformer head 126 and may be configured to up-project the transformer's feature representation to output feature predictions 328 that pertain to the next clip's features back into the original feature space. For example, the output of the transformer may be a 1024_D vector which is then down projected back into feature space.

Upon the output of the action predictions 324 and the feature predictions 328 respectively by the anticipation MLP head 322 and the feature prediction MLP head 326, the neural network 110 may be configured to communicate data pertaining to the action predictions 324 and the feature predictions 328 to the prediction module 204 of the action anticipation application 106. In one embodiment, the prediction module 204 may be configured to analyze the action predictions 324 and the feature predictions 328 and may perform ego-centric action anticipation of the target agent 104 to anticipate the actions of the target agent 104 within the surrounding environment of the ego agent 102 or more future time steps (t, t+1, t+n) based on the action predictions 324 and the feature predictions 328. The ego-centric action anticipation of the target agent 104 may pertain to various tasks of the target agent 104 which may or may not influence future actions of the ego agent 102.

With continued reference to the method 400 of FIG. 4, the method 400 may proceed to block 412, wherein the method 400 may include autonomously controlling the ego agent 102 based on the ego-centric action anticipation of the target agent 104. In an exemplary embodiment, upon performing the ego-centric action anticipation of the target agent 104 to anticipate the actions of the target agent 104 within the surrounding environment of the ego agent 102 or more future time steps, the prediction module 204 may communicate data pertaining to the ego-centric action anticipation to the ego agent control module 206. The ego agent control module 206 may be configured to analyze the received data and may further communicate with the neural network 110 to analyze pre-trained task related data to determine a particular task that is being implemented by the ego agent 102 and/or the target agent 104 and to determine one or more atomic actions that may be implemented by the ego agent 102 in response to the ego-centric action anticipation of the target agent 104 with respect to the completion of an assembly operation, a cooking operation, or a driving operation, etc.

In an exemplary embodiment, the ego agent control module 206 may analyze the task related data in addition to the data pertaining to the ego-centric action anticipation and may communicate autonomous controls to the ECU 112 of the ego agent 102 to autonomously control the operation of the ego agent 102 based on the ego-centric action anticipation of the target agent 104. Stated differently, the ego agent 102 may thereby be autonomously controlled to account for the action predictions 324 and feature predictions 328 associated with the target agent 104 within the surrounding environment of the ego agent 102.

Figure 5:
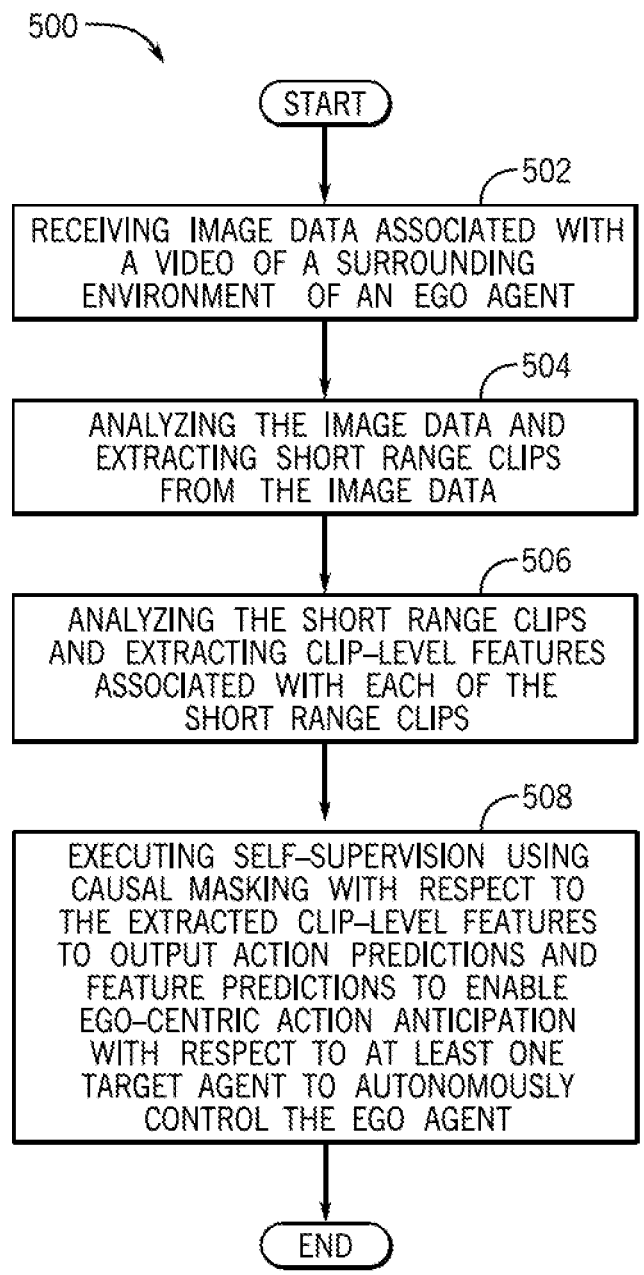
FIG. 5 is a process flow diagram of a method for providing an agent action anticipative transformer according to an exemplary embodiment of the present disclosure.

FIG. 5 is a process flow diagram of a method 500 for providing an agent action anticipative transformer according to an exemplary embodiment of the present disclosure. FIG. 5 will be described with reference to the components of FIG. 1, FIG. 2, and FIG. 3, through it is to be appreciated that the method of FIG. 5 may be used with other systems/components. The method 500 may begin at block 502, wherein the method 500 may include receiving image data associated with a video of a surrounding environment of an ego agent 102.

The method 500 may proceed to block 504, wherein the method 500 may include analyzing the image data and extracting short range clips from the image data. The method 500 may proceed to block 506, wherein the method 500 may include analyzing the short range clips and extracting clip-level features associated with each of the short range clips. The method 500 may proceed to block 508, wherein the method 500 may include executing self-supervision using causal masking with respect to the extracted clip-level features to output action predictions and feature predictions to enable ego-centric action anticipation with respect to at least one target agent 104 to autonomously control the ego agent 102.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for providing an agent action anticipative transformer comprising:
   receiving image data associated with a video of a surrounding environment of an ego agent;
   analyzing the image data and extracting short range clips from the image data;
   analyzing the short range clips and extracting clip-level features associated with each of the short range clips; and
   executing self-supervision using causal masking with respect to the extracted clip-level features to output action predictions and feature predictions to enable ego-centric action anticipation with respect to at least one target agent to autonomously control the ego agent.

2. The computer-implemented method of claim 1, wherein receiving the image data includes capturing an ego-centric video of the surrounding environment of the ego agent that includes the at least one target agent.

3. The computer-implemented method of claim 2, wherein extracting the short range clips from the image data includes splitting the ego-centric video into the short range clips that each include a particular number of frames of the ego-centric video.

4. The computer-implemented method of claim 3, wherein extracting the clip-level features associated with each of the short range clips includes inputting the short range clips to a multiscale vision transformer of a neural network to extract the clip-level features.

5. The computer-implemented method of claim 4, wherein the clip-level features are output by the multiscale vision transformer as clip embeddings and output tokens corresponding to the clip-level features are used for clip level losses to train an extra anticipation token to learn information from all input clip tokens that pertains to the at least one target agent.

6. The computer-implemented method of claim 5, wherein executing the self-supervision using the causal masking includes shuffling the clip embeddings and adding absolute position embeddings to retain information regarding an order of the clip embeddings in a sequence.

7. The computer-implemented method of claim 6, wherein executing the self-supervision using the causal masking includes providing information about what a next shuffled clip is and adding the information about the next shuffled clip as shuffled embeddings that are provided with future position encoding that are inputted to an action anticipative transformer head of the neural network.

8. The computer-implemented method of claim 7, further including temporally aggregating data associated with the shuffled embeddings that are provided with future position encoding to span a long-term horizon to provide an output class token that includes information with respect to predicted clip features for all of the input clip tokens and to provide future feature embeddings pertaining to a prediction of the next clip's features.

9. The computer-implemented method of claim 8, wherein the output class token is inputted a first MLP head of the neural network to output the action predictions of the target agent and the future feature embeddings are inputted to a second MLP head of the neural network to output the feature predictions that pertain to the next clip's features back into an original feature space.

10. A system for providing an agent action anticipative transformer comprising:
    a memory storing instructions when executed by a processor cause the processor to:
    receive image data associated with a video of a surrounding environment of an ego agent;
    analyze the image data and extract short range clips from the image data;
    analyze the short range clips and extract clip-level features associated with each of the short range clips; and
    execute self-supervision using causal masking with respect to the extracted clip-level features to output action predictions and feature predictions to enable ego-centric action anticipation with respect to at least one target agent to autonomously control the ego agent.

11. The system of claim 10, wherein receiving the image data includes capturing an ego-centric video of the surrounding environment of the ego agent that includes the at least one target agent.

12. The system of claim 11, wherein extracting the short range clips from the image data includes splitting the ego-centric video into the short range clips that each include a particular number of frames of the ego-centric video.

13. The system of claim 12, wherein extracting the clip-level features associated with each of the short range clips includes inputting the short range clips to a multiscale vision transformer of a neural network to extract the clip-level features.

14. The system of claim 13, wherein the clip-level features are output by the multiscale vision transformer as clip embeddings and output tokens corresponding to the clip-level features are used for clip level losses to train an extra anticipation token to learn information from all input clip tokens that pertains to the at least one target agent.

15. The system of claim 14, wherein executing the self-supervision using the causal masking includes shuffling the clip embeddings and adding absolute position embeddings to retain information regarding an order of the clip embeddings in a sequence.

16. The system of claim 15, wherein executing the self-supervision using the causal masking includes providing information about what a next shuffled clip is and adding the information about the next shuffled clip as shuffled embeddings that are provided with future position encoding that are inputted to an action anticipative transformer head of the neural network.

17. The system of claim 16, wherein the action anticipative transformer head of the neural network temporally aggregates data associated with the shuffled embeddings that are provided with future position encoding to span a long-term horizon to provide an output class token that includes information with respect to predicted clip features for all of the input clip tokens and provides future feature embeddings pertaining to a prediction of the next clip's features.

18. The system of claim 17, wherein the output class token is inputted a first MLP head of the neural network to output the action predictions of the target agent and the future feature embeddings are inputted to a second MLP head of the neural network to output the feature predictions that pertain to the next clip's features back into an original feature space.

19. A non-transitory computer readable storage medium storing instructions that when executed by a computer, which includes a processor performs a method, the method comprising:
   receiving image data associated with a video of a surrounding environment of an ego agent;
   analyzing the image data and extracting short range clips from the image data;
   analyzing the short range clips and extracting clip-level features associated with each of the short range clips; and
   executing self-supervision using causal masking with respect to the extracted clip-level features to output action predictions and feature predictions to enable ego-centric action anticipation with respect to at least one target agent to autonomously control the ego agent.

20. The non-transitory computer readable storage medium of claim 19, wherein an output class token is inputted a first MLP head of a neural network to output the action predictions of the target agent and future feature embeddings are inputted to a second MLP head of the neural network to output the feature predictions that pertain to a next clip's features back into an original feature space.

* * * * *